United States Patent
Matsuzaki

(10) Patent No.: US 8,139,268 B2
(45) Date of Patent: Mar. 20, 2012

(54) IMAGE PROCESSING APPARATUS AND IMAGE PROCESSING METHOD OF GENERATING MONOCHROME IMAGE DATA FROM TWO COLOR COMPONENTS

(75) Inventor: Masanori Matsuzaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 704 days.

(21) Appl. No.: 12/269,278

(22) Filed: Nov. 12, 2008

(65) Prior Publication Data
US 2009/0147326 A1     Jun. 11, 2009

(30) Foreign Application Priority Data

Dec. 7, 2007 (JP) ................................ 2007-317589

(51) Int. Cl.
*H04N 1/40* (2006.01)
(52) U.S. Cl. ........ 358/3.23; 358/518; 358/2.1; 358/501; 358/505; 358/514; 358/523; 382/163; 382/167

(58) Field of Classification Search .............. 358/3.23, 358/518, 2.1, 501, 505, 514, 523; 382/163
See application file for complete search history.

(56) References Cited

U.S. PATENT DOCUMENTS

| 4,926,253 | A | * | 5/1990 | Nakashima et al. | .......... 358/515 |
| 7,714,901 | B2 | * | 5/2010 | Li | .............. 348/222.1 |
| 7,760,937 | B2 | * | 7/2010 | Ochs et al. | ................ 382/167 |

FOREIGN PATENT DOCUMENTS

| JP | 62-133866 | 6/1987 |
| JP | 2005-252636 | 9/2005 |
| JP | 2005-303589 | 10/2005 |

* cited by examiner

*Primary Examiner* — Benny Tieu
*Assistant Examiner* — Jamares Q Washington
(74) *Attorney, Agent, or Firm* — Fitzpatrick, Cella, Harper & Scinto

(57) ABSTRACT

A color document is scanned using sensors of two color components, and monochrome image data is generated by performing a color conversion process on color image data made up of two color components obtained through the scanning.

9 Claims, 14 Drawing Sheets

| INPUT | | | OUTPUT | | |
|---|---|---|---|---|---|
| R | G | B | R | G | B |
| 0 | 0 | 0 | 0 | 0 | 0 |
| 0 | 0 | 36 | 0 | 0 | 28 |
| ... | ... | ... | ... | ... | ... |
| 255 | 255 | 219 | 250 | 245 | 210 |
| 255 | 255 | 255 | 255 | 255 | 255 |

~304

| INPUT | | | OUTPUT | | | | |
|---|---|---|---|---|---|---|---|
| R | G | B | C | M | Y | K | |
| 0 | 0 | 0 | 80 | 80 | 80 | 255 | ~307 |
| 0 | 0 | 36 | 100 | 100 | 50 | 200 | |
| ... | ... | ... | ... | ... | ... | ... | |
| 255 | 255 | 219 | 0 | 0 | 35 | 0 | |
| 255 | 255 | 255 | 0 | 0 | 0 | 0 | |

FIG. 16

| INPUT | | OUTPUT | |
|---|---|---|---|
| G | B | MONOCHROME | ~1514 |
| 210 | 210 | 210 | |
| 210 | 225 | 218 | |
| ... | ... | ... | |
| 255 | 210 | 221 | |
| ... | ... | ... | |
| 255 | 255 | 243 | |
| 255 | 255 | 255 | |

FIG. 18

MONOCHROME COPY

PLEASE SELECT COLOR TO PRIORITIZE FOR REPRODUCIBILITY.

- ● PRIORITIZE REPRODUCIBILITY OF RED
- ○ PRIORITIZE REPRODUCIBILITY OF GREEN
- ○ PRIORITIZE REPRODUCIBILITY OF BLUE
- ○ PRIORITIZE REPRODUCIBILITY OF YELLOW

[EXECUTE]

1801

IMAGE PROCESSING APPARATUS AND IMAGE PROCESSING METHOD OF GENERATING MONOCHROME IMAGE DATA FROM TWO COLOR COMPONENTS

BACKGROUND OF THE INVENTION

1. Field of the Invention

The present invention relates to an image processing apparatus and an image processing method that perform color conversion processing on color image data and outputs monochrome image data.

2. Description of the Related Art

Scanners installed in monochrome multi-function peripherals (MFPs) conventionally have one light source and one type of sensor. When copying monochrome documents using such a configuration, it is possible to maintain the gradation; however, when copying color documents with such a configuration, some colors will disappear, appear patchy, or the like due to the spectral properties of the light source, the sensitivity of the sensor, and so on.

For example, there is a problem that while a red document can be accurately copied in monochrome, copying a yellow document in monochrome results in data loss.

FIG. 1 is a diagram illustrating such a problem, where copying using a monochrome multi-function peripheral results in data loss. 101 is a monochrome document, 102 is a red color document, and 103 is a yellow color document; 104 to 106 represent the results of making monochrome copies of the documents 101 to 103. As shown in FIG. 1, the monochrome document 101 is faithfully reproduced in the result 104. The red color document 102 is also faithfully reproduced in the result 105.

However, the data toward the highlight side of the yellow color document 103 is lost in the result 106. Of course, the colors for which data tends to be lost differ from device to device, and thus the actual result may not necessarily correspond exactly to the result shown in FIG. 1.

As opposed to a monochrome MFP, which has a single type of sensor, scanners installed in conventional color MFPs have three types of sensors for a single light source, and separate scanned data into three types of data, or A, G, and B. When making a monochrome copy, the monochrome data is created by mixing the RGB data at a certain ratio. This has an advantage in that the color separation capabilities are higher than those of the monochrome MFP, which has only a single sensor.

This advantage makes it possible for a color MFP to reproduce colors that would disappear with a monochrome MFP when making a monochrome copy of a color document. However, because three types of sensors are driven, there is a problem that making a monochrome copy takes a similar amount of time as making a color copy.

Accordingly, a technique for improving the speed of making monochrome copies in a color MFP by driving three types of sensors when making a color copy and driving only one of those types of sensors when making a monochrome copy has been proposed (for example, see Japanese Patent Laid-Open No. 2005-252636).

However, because the abovementioned conventional technique uses only a single type of sensor when making a monochrome copy, there is a problem that specific colors cannot be reproduced when copying a color document, as is the case with a monochrome MFP. In addition, as described above, if the document is scanned using the three types of sensors in order to increase the reproduction accuracy, the driving time is longer than when using a single sensor, resulting in a problem that the time a user must wait increases.

SUMMARY OF THE INVENTION

It is an object of the present invention to enable the reproduction of highlight portions of colors when performing color conversion processing on color image data and outputting monochrome image data.

According to one aspect of the present invention, an image processing apparatus comprises: a reading unit that reads a color document using sensors for two color components; and a generation unit that generates monochrome image data by performing a color conversion process on color image data having two color components obtained from the reading unit.

According to another aspect of the present invention, an image processing method comprises: reading a color document using sensors for two color components; and generating monochrome image data by performing a color conversion process on color image data having two color components obtained in the reading step.

Further features of the present invention will become apparent from the following description of exemplary embodiments (with reference to the attached drawings).

BRIEF DESCRIPTION OF THE DRAWINGS

FIG. 16 is a diagram illustrating an example of a 2D-to-1D conversion LUT (initial value change) in the third embodiment.

FIG. 18 is a diagram illustrating an example of a user interface screen 1801 in the fourth embodiment.

DESCRIPTION OF THE EMBODIMENTS

Preferred embodiments for carrying out the present invention shall be described in detail hereinafter with reference to the drawings.

Figure 1:
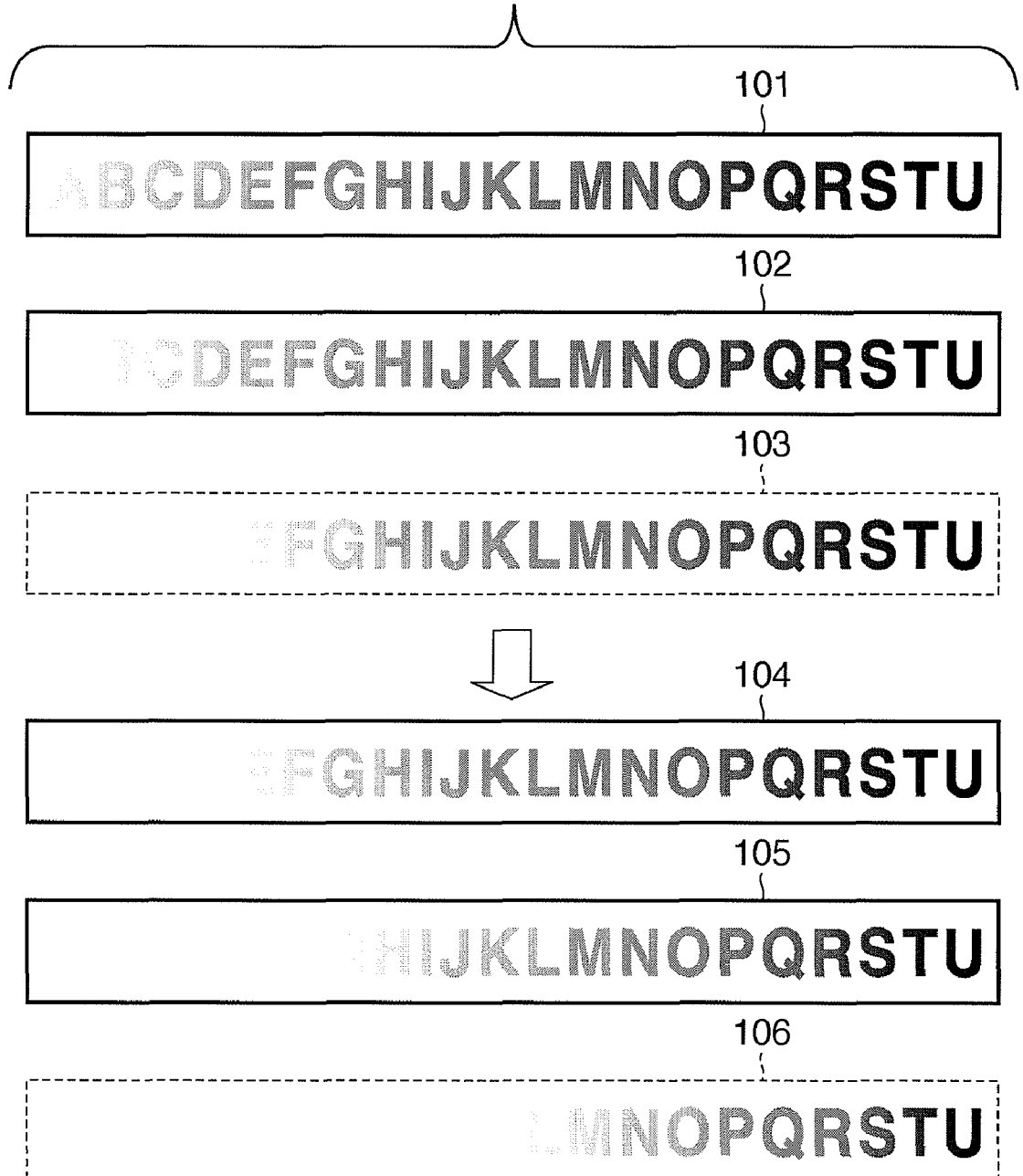
FIG. 1 is a diagram illustrating a problem where copying using a monochrome multi-function peripheral results in data loss.
Figure 2:
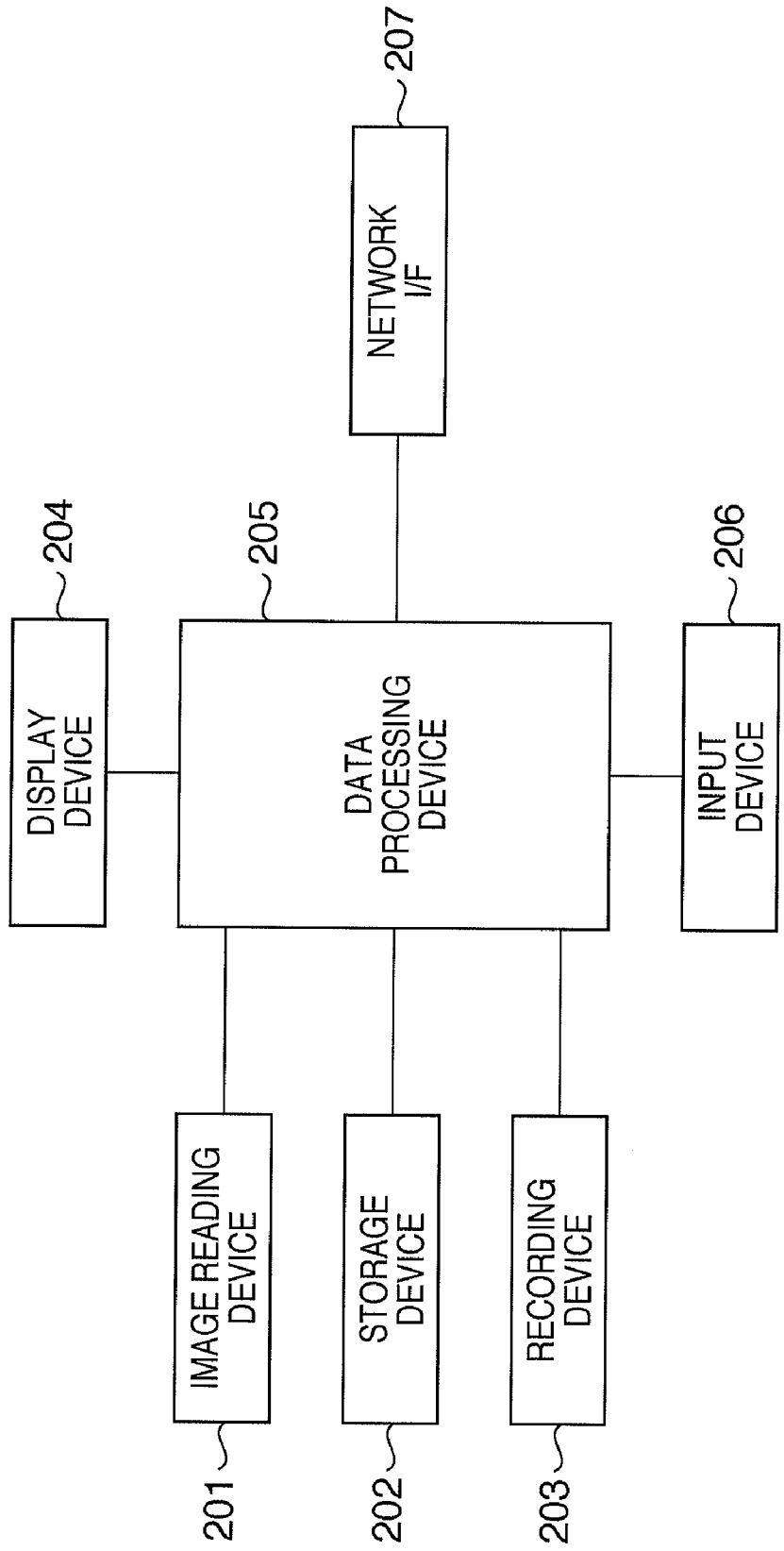
FIG. 2 is a diagram illustrating an example of a configuration of a multi-function peripheral (MFP) according to an embodiment of the present invention.

FIG. 2 is a diagram illustrating an example of a configuration of a multi-function peripheral (MFP) according to an embodiment of the present invention. An image reading device 201 is a scanner that includes an automatic document transport device. An image of a bundle of documents or a single document is irradiated by a light source (not shown), the light reflected therefrom is formed as an image upon a solid-state image sensor, such as a CDD, using a lens, and an image read signal in raster form is obtained as image data through photoelectric conversion using the solid-state image sensor. In the case of a color MFP, RGB color image data is obtained by attaching three types of color filters to the solid-state image sensor. However, in the case of a monochrome MFP, multiple types of color filters are not attached; rather, a single type of signal value is obtained as the image data.

A recording device 203 is a printer that carries out image formation using a printer engine of an electrophotographic method, an inkjet method or the like. When executing the copy function of the MFP, a data processing device 205 performs background removal processing, color conversion processing, luminance/density conversion processing, screen processing, and so on, the image data scanned by the image reading device 201, and outputs the resultant to the recording device 203. Meanwhile, the recording device 203 forms an image on paper in accordance with CMYK image data, monochrome image (density) data, and so on processed by the data processing device 205, and outputs the result.

Here, instructions and so on made to the MFP by an operator are carried out through an input device 206, which is a key-based operational unit installed in the MFP, and the series of operations based thereupon are controlled by a control unit (not shown) within the data processing device 205.

Meanwhile, the status of the operational input, the image data currently being processed, and so on is displayed in a display device 204. The display device 204 may be configured as a touch panel with which the input device 206 is also integrated, thereby providing a user interface function to the user.

A storage device 202 is a high-capacity storage device, such as a hard disk device or the like, capable of storing image data scanned by the image reading device 201. A network I/F 207 is an interface used for connecting to a network.

The network I/F 207 makes it possible to receive print data from a personal computer (PC) or the like, perform image processing on the received data using the data processing device 205, and then perform image formation using the recording device 203. It is also possible to scan a document image using the image reading device 201, perform image processing on the scanned data using the data processing device 205, and send the result to a PC or the like via the network I/F 207.

Next, a general image process performed by the image reading device 201 and the data processing device 205 shall be described. First, a color copying process performed by a color MFP that includes the image reading device 201, which has three types of color filters, or R, G, and B, attached, shall be described using FIGS. 3 to 6.

Figure 3:
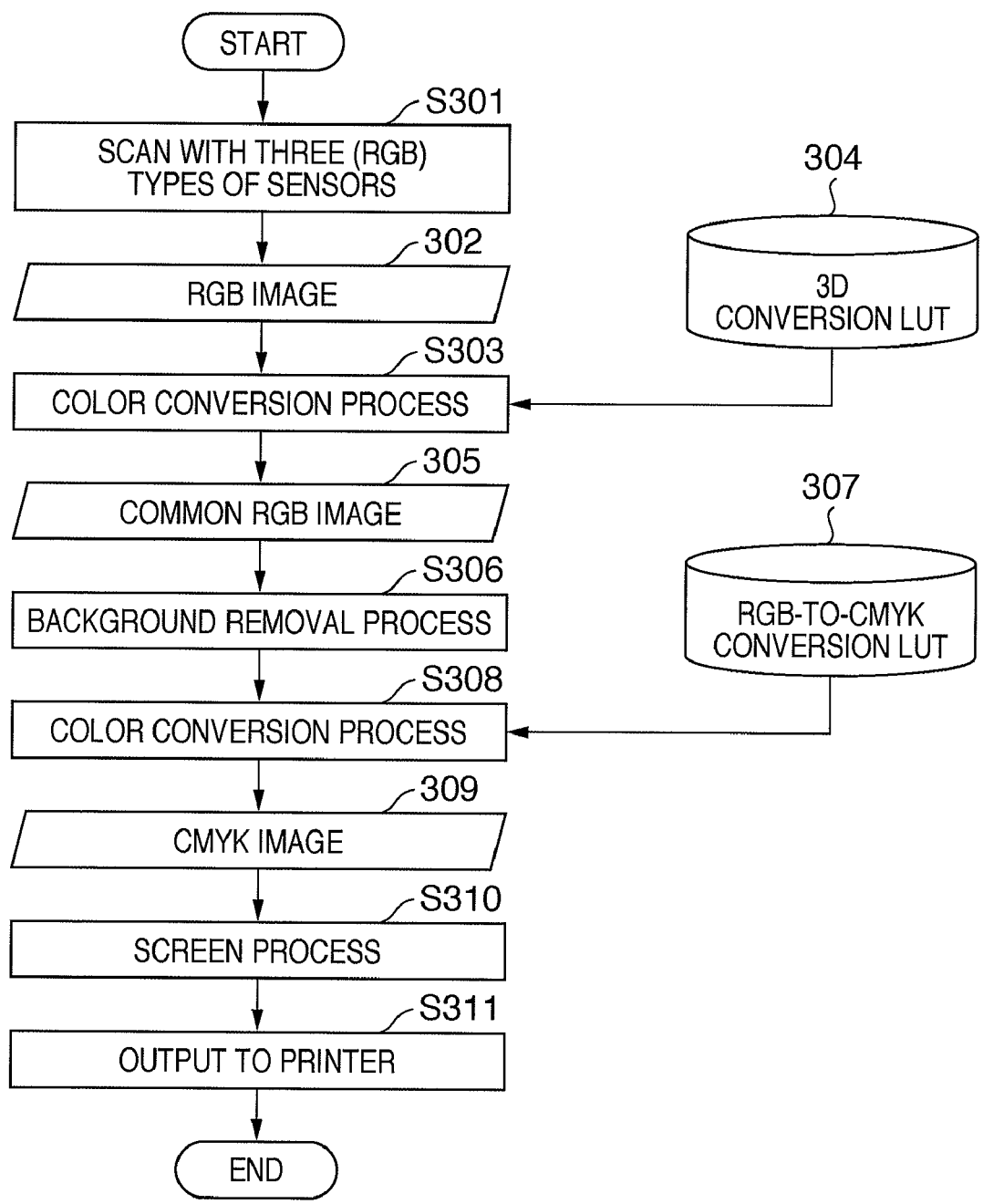
FIG. 3 is a flowchart illustrating a color copy process performed using a typical color MFP.

FIG. 3 is a flowchart illustrating a color copy process performed using a typical color MFP. In Step S301, the image reading device 201 scans using the three types of sensors, and outputs RGB image data 302 to the data processing device 205. In Step S303, the data processing device 205 performs color conversion processing using a 3D conversion LUT 304, and obtains common RGB image data 305. Here, "common RGB" refers to RGB that is associated with calorimetric values such as Lab or XYZ, and can be uniquely converted through computations.

Figures 4, 5:
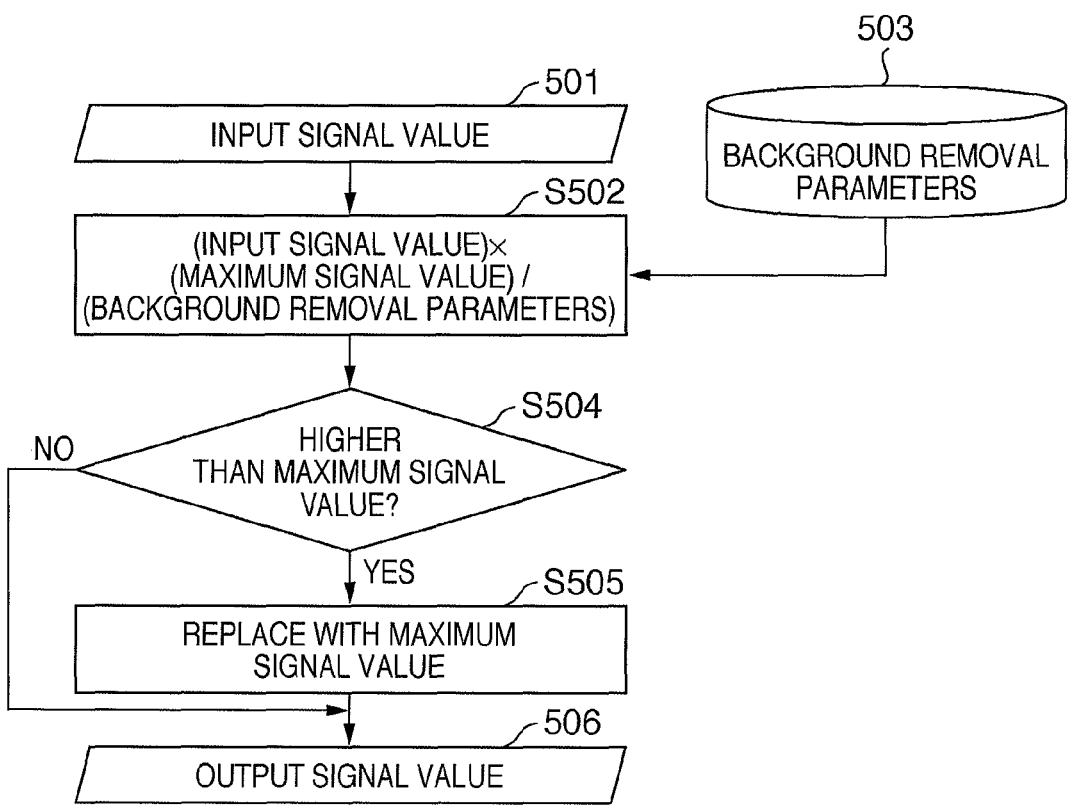
FIG. 4 is a diagram illustrating an example of the structure of a 3D conversion LUT 304.
FIG. 5 is a flowchart illustrating a background removal process indicated by S306 in FIG. 3.

FIG. 4 is a diagram illustrating an example of the structure of the 3D conversion LUT 304. As shown in FIG. 4, output RGB values corresponding to the inputted RGB values divided at a set interval are defined in the 3D conversion LUT 304. The color conversion process in S303 of FIG. 3 uses the 3D conversion LUT 304 to find the common RGB image data 305, which is the output RGB values; however, in the case where there are no values that conform to the input RGB values, multiple grid points are extracted and interpolation processing is performed.

When the color conversion process of Step S303 ends, the data processing device 205 then carries out a background removal process in Step S306. The background removal process mentioned here is a process that avoids the use of toner on white portions of paper by converting the white paper data into the value in the signal that represents the lightest color (255, in the case of an 8-bit signal).

FIG. 5 is a flowchart illustrating the background removal process indicated by S306 in FIG. 3. First, in Step S502, an input signal value 501 is calculated in accordance with a predetermined calculation formula using background removal parameters 503. Here, this predetermined calculation formula is a formula such as the one indicated below.

(input signal value)×(maximum signal value)/(background removal parameters)

Next, in Step S504, it is checked whether or not the results of this calculation exceed the maximum signal value. For example, the maximum signal value is 255 in the case where the input signal value 501 is 8-bit. In the case where the results of the calculation exceed the maximum signal value, the process advances to Step S505, where the results of the calculation are overwritten with the maximum signal value, which is then used as the output signal value 506. However, in the case where the maximum signal value is not exceeded in Step S504, the results of the calculation are taken as the output signal value 506.

Note that the background removal process is not limited to the process shown in FIG. 5, and a non-linear conversion process, for example, may be used to increase the accuracy.

When the background removal process of Step S306 has ended, a color conversion process is then performed using a RGB-to-CMYK conversion LUT 307 in Step S308, thereby obtaining CMYK image data 309.

Figures 6, 7:
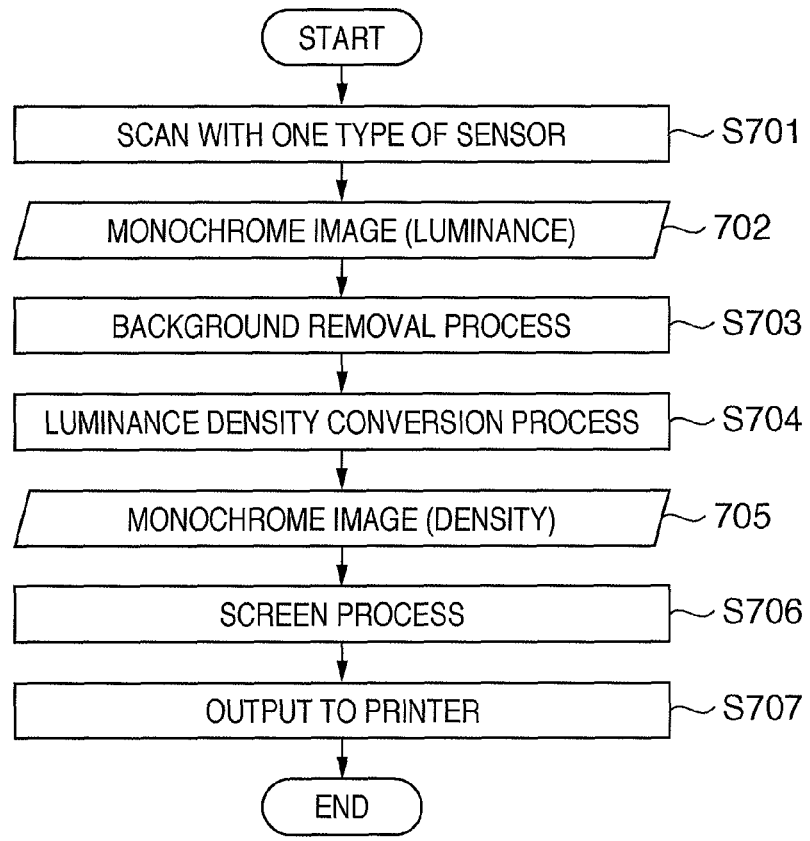
FIG. 6 is a diagram illustrating an example of the structure of an RGB-to-CMYK conversion LUT 307.
FIG. 7 is a flowchart illustrating a monochrome copy process performed using a monochrome MFP.

FIG. 6 is a diagram illustrating an example of the structure of the RGB-to-CMYK conversion LUT 307. As shown in FIG. 6, output CMYK values corresponding to the input RGB values divided at a set interval are defined in the RGB-to-CMYK conversion LUT 307. As with the 3D conversion LUT 304 shown in FIG. 4, the color conversion process uses the RGB-to-CMYK conversion LUT 307 to find the output CMYK values; however, in the case where there are no values that conform to the input RGB values, multiple grid points are extracted and interpolation computation is performed.

When the abovementioned color conversion process has ended, the data processing device 205 then performs a publicly-known screen processing in Step S310, thereby generating screen data. Then, in Step S11, that screen data is outputted to the printer, which is the recording device 203.

Next, a copying process performed by a monochrome MFP that includes an image reading device 201 having a single type of sensor shall be described with reference to FIG. 7. In this case, the sensor is assumed not to have a color filter attached thereto.

FIG. 7 is a flowchart illustrating a monochrome copy process performed using a monochrome MFP. In Step S701, the image reading device 201 scans using the single type of sensor, and obtains monochrome image data (luminance) 702. Next, in Step S703, the data processing device 205 performs the background removal process illustrated using FIG. 5. Then, in Step S704, luminance/density conversion is performed, and monochrome image data (density) 705 is obtained.

When the stated luminance/density conversion process ends, the data processing device 205 then performs a publicly-known screen processing in Step S706, thereby generating screen data. Then, in Step S707, that screen data is outputted to the printer, which is the recording device 203.

Next, a monochrome copying process performed by a color MFP that includes an image reading device 201 having a sensor with three types, or R, G, and B, of color filters attached thereto shall be described with reference to FIG. 8.

Figure 8:
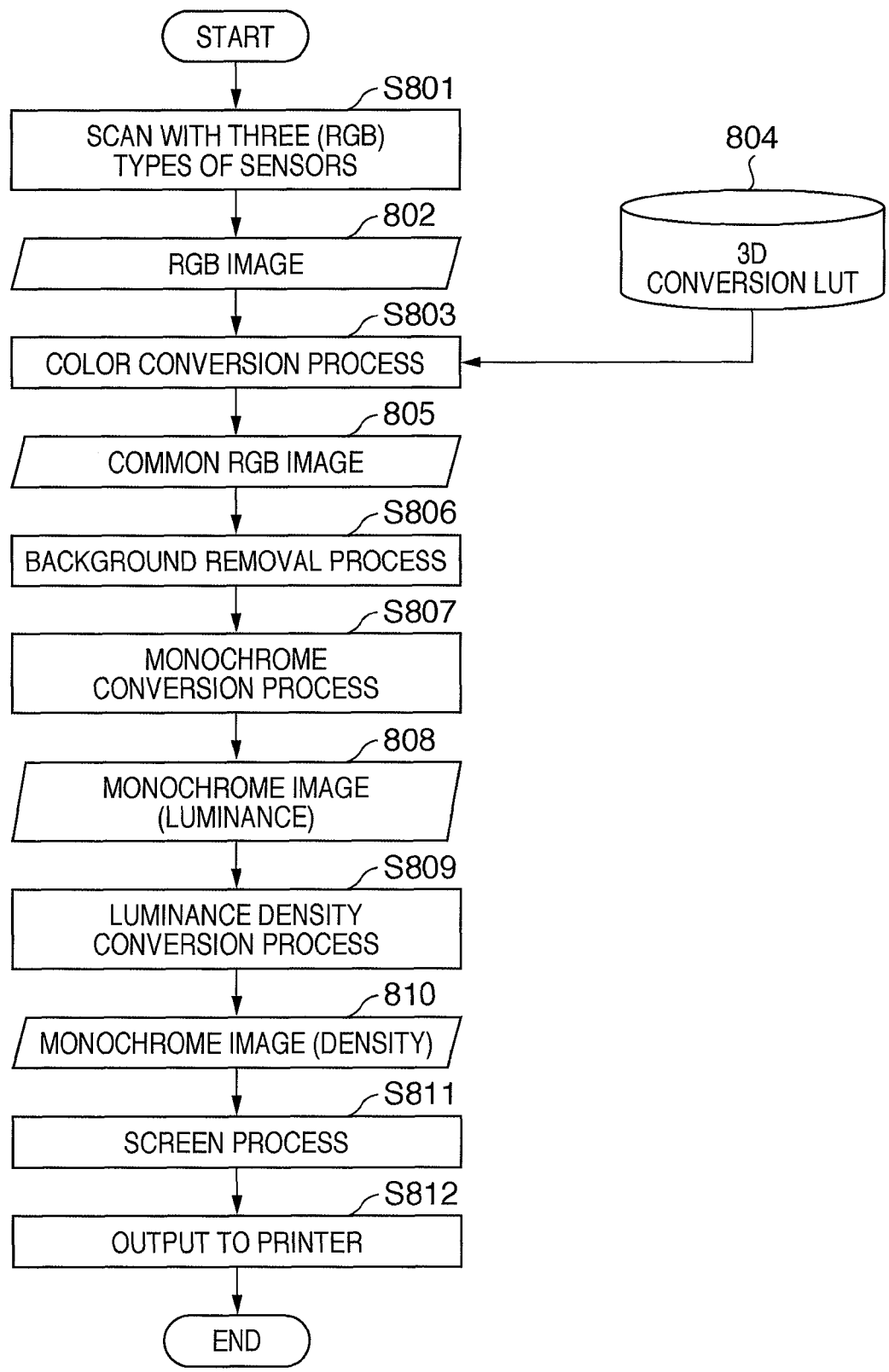
FIG. 8 is a flowchart illustrating a monochrome copy process performed by a color MFP.

FIG. 8 is a flowchart illustrating a monochrome copy process performed by a color MFP. The processes of Steps S801 to S806 in FIG. 8 are the same as the processes of Steps S301 to S306 in FIG. 3, and thus descriptions thereof shall be omitted.

In Step S807, a monochrome conversion process is performed, converting common RGB image data 805 on which a background removal process was performed in S806 into monochrome image data (luminance) 808. To be more specific, the common RGB image data 805 is blended at an RGB ratio of 3:6:1, generating the monochrome image data (luminance) 808. Note that the monochrome conversion process is not limited thereto, and the monochrome image data may be generated using another method. Furthermore, the RGB blending ratio is not limited hereto, and the blending may use a different ratio instead.

The processes of Steps S809 to S812 are the same as the processes of Steps S704 to S707 in FIG. 7, and thus descriptions thereof shall be omitted.

According to a general image process as described thus far, when performing monochrome copying as illustrated in FIG. 7 or FIG. 8, either the color reproducibility or the processing speed poses a problem, as illustrated above.

First Embodiment

Next, a method for generating monochrome image data from two types of color component data by using a 2D-to-1D conversion LUT shall be described, the color component data being obtained by scanning a document using two types of sensors from among the three types of sensors included in a color MFP. The 2D-to-1D conversion LUT mentioned here is a Look-Up Table that outputs one-dimensional output data for two-dimensional input data in which the data of two color components has been combined based on a predetermined rule.

Figure 9:
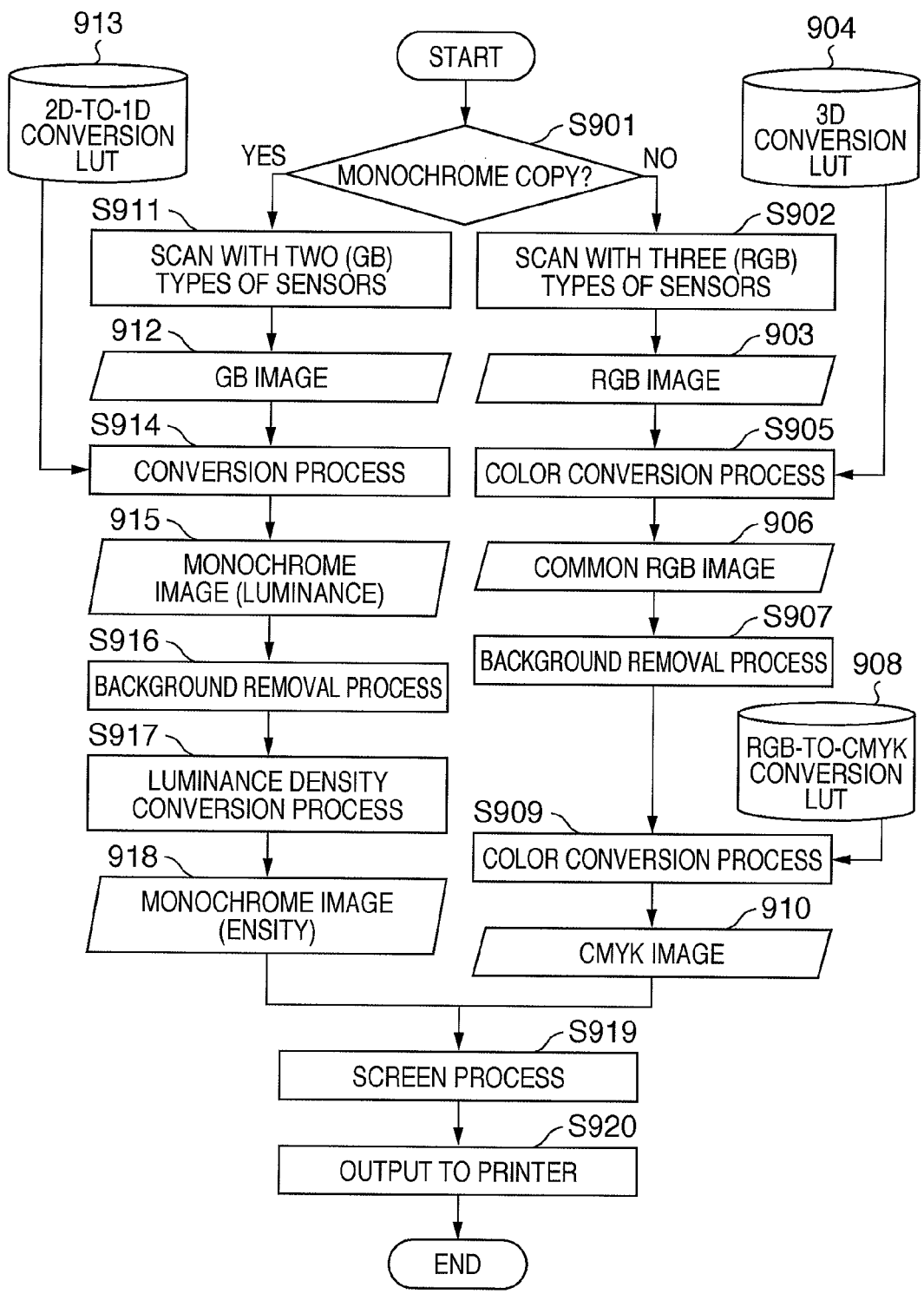
FIG. 9 is a flowchart illustrating a copy process according to a first embodiment using a color MFP.

FIG. 9 is a flowchart illustrating a copy process according to the first embodiment using a color MFP. First, in Step S901, the data processing device 205 determines whether or not the copy to be made is a monochrome copy. Here, if the copy is a color copy rather than a monochrome copy, the procedure moves to Step S902, where the image reading device 201 performs a scan using three types, or R, G, and B, of sensors. Note that the processes of Steps S902 to S909, S919, and S920 are the same as those of Steps S301 to S311 in FIG. 3, and thus descriptions thereof shall be omitted.

However, if in Step S901 it has been determined that the copy is a monochrome copy, the procedure advances to Step S911, where scanning is performed using two types of sensors. G and B are selected from RGB in this example, but any two sensors may be selected. In Step S911, GB image data 912 is obtained by performing the scan using the two types, or G and B, of sensors. Then, in Step S914, monochrome image data (luminance) 915 is obtained by using the 2D-to-1D conversion LUT 913. Note that a method for generating this 2D-to-1D conversion LUT 913 shall be described later using FIG. 10.

As described above, after the monochrome image data (luminance) 915 is generated, a background removal process is performed in Step S916, and a luminance/density conversion process is performed in Step S917, thereby obtaining monochrome image data (density) 918, as per the normal monochrome copy process. Then, in Step S919, a publicly-known screen process is performed, and that screen data is outputted to a printer in Step S920.

Figure 10:
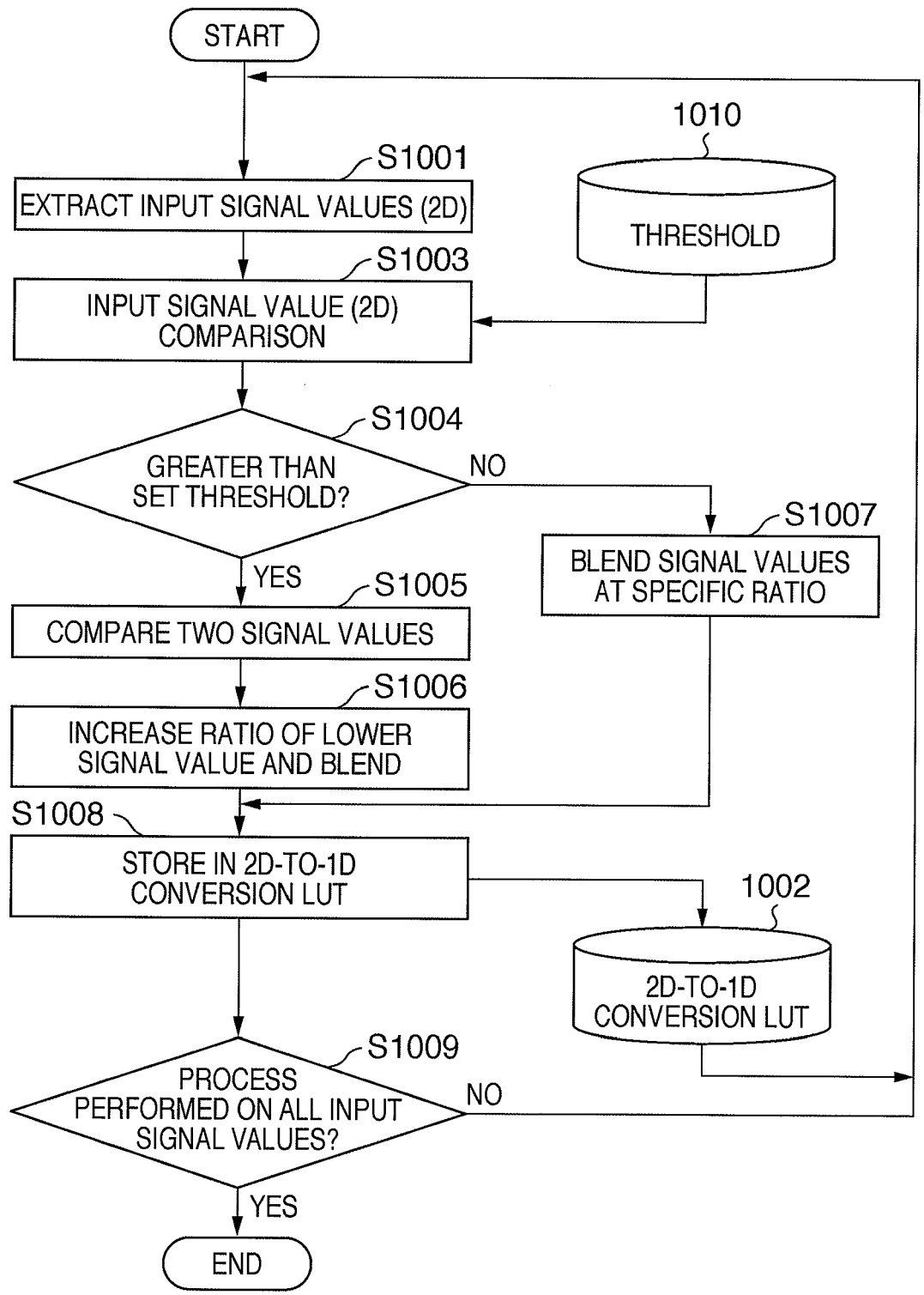
FIG. 10 is a flowchart illustrating a process for creating a 2D-to-1D conversion LUT.

Next, a method for generating the 2D-to-1D conversion LUT 913 for converting image data read by two types of sensors into monochrome image data shall be described in detail using FIG. 10.

FIG. 10 is a flowchart illustrating a process for creating a 2D-to-1D conversion LUT. First, in Step S1001, input signal values (2D) are extracted from a 2D-to-1D conversion LUT 1002.

Figure 11:
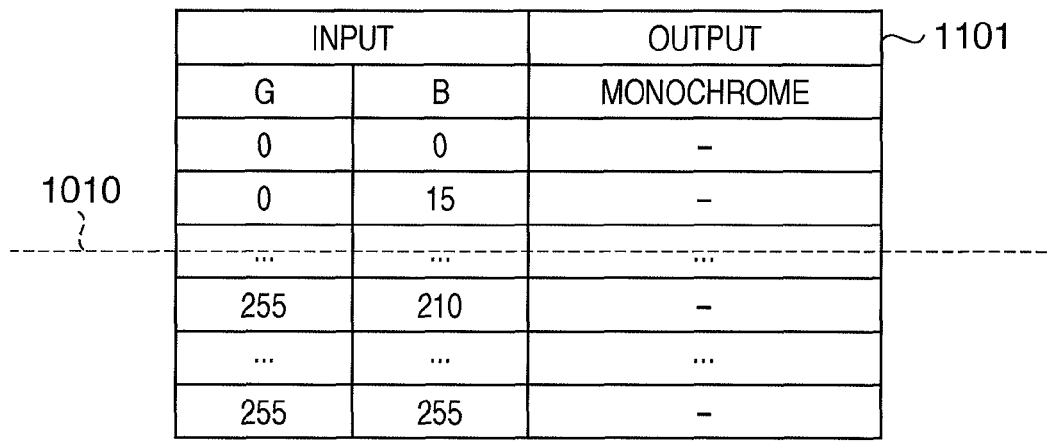
FIG. 11 is a diagram illustrating an example of the structure of a 2D-to-1D conversion LUT in an initial stage.

FIG. 11 is a diagram illustrating an example of the structure of a 2D-to-1D conversion LUT in an initial stage. Here, the image data has been scanned using two types, or G and B, of sensors, and thus the input data is G and B, and is divided at a set interval. Although the 2D-to-1D conversion LUT 1002 defines the monochrome output values that correspond to these input signal values, the values are not set at the initial stage, and thus are a blank column, as indicated by 1101. Although the processing illustrated in FIG. 10 is carried out on all combinations of these input signal values, only one of these combinations is extracted in Step S1001.

Next, in Step S1003, a threshold 1010 is taken and compared with the input signal values. The threshold 1010 is dependent on highlight data, and thus, for example, the minimum value of data that is skipped during the background removal process can be set as the threshold value. It goes without saying that any value may be set as the threshold. Here, while the comparison is made against two input signal values, the comparison may be made against just one of the values.

Next, in Step S1004, it is determined whether or not the values are greater than the set threshold. Here, in the case where either of the two input signal values is greater than the threshold, a determination of "greater" is made. Of course, the process may also make a determination of "greater" in the case where both values are greater than the threshold. In the case where the result of the determination indicates that the values are not greater than the threshold, the procedure advances to Step S1007, where the two signal values are blended at a set ratio and monochrome image data is generated. Next, in Step S1008, the results are stored in the 2D-to-1D conversion LUT 1002.

Here, the blend ratio may be any ratio, but the present example uses a ratio of "3:1" as the blend ratio. For example, the present example has a ratio of "G component:B component=3:1".

Meanwhile, if the result of the determination made in Step S1004 above is greater than the threshold, the procedure advances to Step S1005, where the sizes of the two signal values are compared. After this, in Step S1006, the ratio of the signal value that is lower is increased, and blending is carried out.

Figure 12:
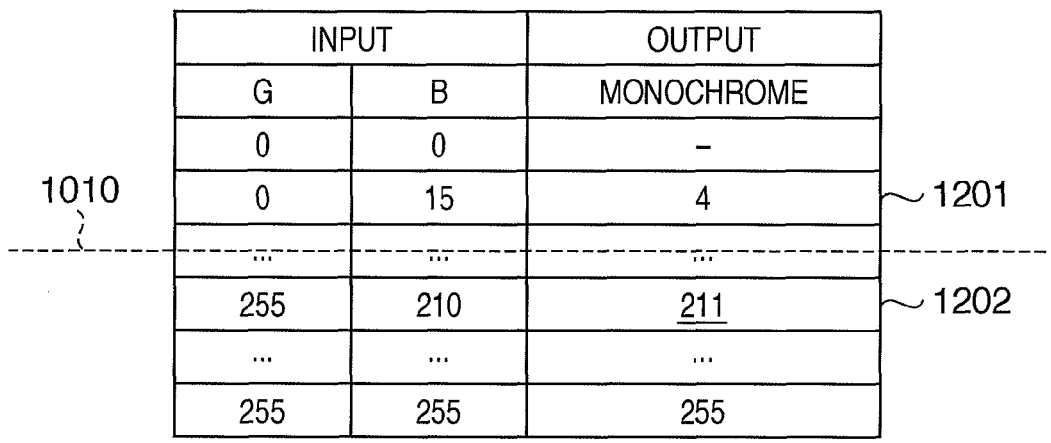
FIG. 12 is a diagram illustrating an example of a 2D-to-1D conversion LUT that stores monochrome output values.

FIG. 12 is a diagram illustrating an example of a 2D-to-1D conversion LUT that stores monochrome output values. Here, 1201 is data that is lower than the threshold 1010, and 1202 is data that is greater than the threshold 1010. The input signal values (0, 15) that are lower than the threshold 1010, as indicated by 1201, are blended at a blending ratio of 3:1, and thus the monochrome output signal value is 4.

As opposed to this, the G and B of the input signal values (255, 210) that are greater than the threshold, as indicated by 1202, are compared to each other. Here, G, at 255, is greater, and thus a blending ratio in which G is lower is set. In this example, the normal blending ratio is reversed, resulting in 1:3, based upon which the monochrome output value is created, and thus the value is 221. Of course, any setting method may be used as long as the ratio of a great input signal value is reduced.

Figure 13:
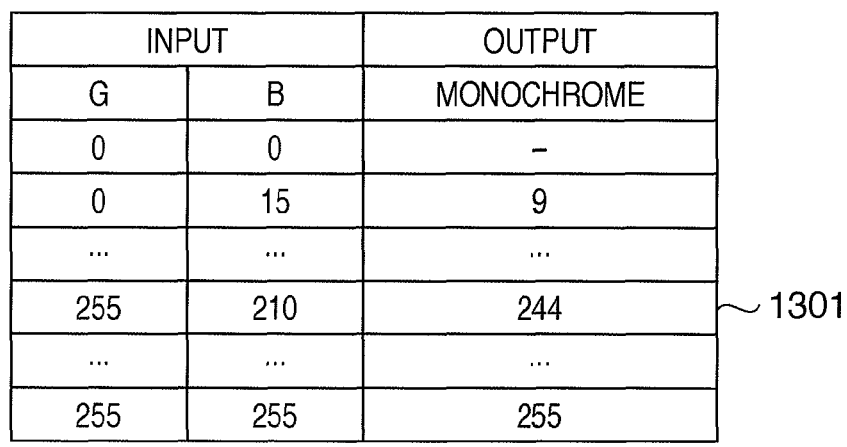
FIG. 13 is a diagram illustrating an example of a 2D-to-1D conversion LUT when all data has been created using a constant blend ratio.

FIG. 13 is a diagram illustrating an example of a 2D-to-1D conversion LUT when all data has been created using a constant blend ratio. Here, the data of the input signal values (255, 210) indicated by 1301 is also blended at a blending ratio of 3:1, and thus the monochrome output value is 244. However, a color of this value may vanish as a result of the background removal process.

In response to this, in the example illustrated in FIG. 12, the monochrome output value is 221, and a color of that value is highly unlikely to vanish as a result of the background removal process; thus it is possible to improve the reproducibility.

Returning to FIG. 10, after the signal values are blended in Step S1006, the values are stored in the 2D-to-1D conversion LUT 1002 in Step S1008. Then, in Step S1009, it is determined whether or not all the input signal values have been processed; in the case where all the input signal values have not been processed, the procedure returns to Step S1001, and the above processing is repeated. The processing ends in the case where all the input signal values have been processed.

Although the 2D-to-1D conversion LUT 1002 used in the first embodiment is created using several types of fixed blending ratios, the blending ratio may be adaptively changed by, for example, changing the blending ratio based on the input signal values. Furthermore, while the threshold is set using highlights as its reference, any reference may be used for the threshold.

In addition, although a copying process has been described as an example, the present embodiment may be applied to any process as long as that process uses a scanner, such as a transmission process. Furthermore, although the embodiment discusses three types of sensors being installed in the scanner, any number of types may be used as long as that number is three or more.

According to the first embodiment, it is possible to improve the performance when making a monochrome copy by scanning using two types of sensors. It is furthermore possible to improve the reproducibility when making a monochrome copy of a color document by carrying out processing using a 2D-to-1D conversion LUT that focuses on highlight data.

Moreover, by using a small amount of types of sensors, the driving time can be reduced, making it possible to implement a color conversion process that achieves both good color reproducibility and speed.

Second Embodiment

Next, a second embodiment according to the present invention shall be described in detail with reference to the drawings. Although a 2D-to-1D conversion LUT is used in the first embodiment, the second embodiment describes a method in which threshold determination is performed on the pixel values of a scanned image and a monochrome image is generated based on a corresponding conversion ratio.

Figure 14:
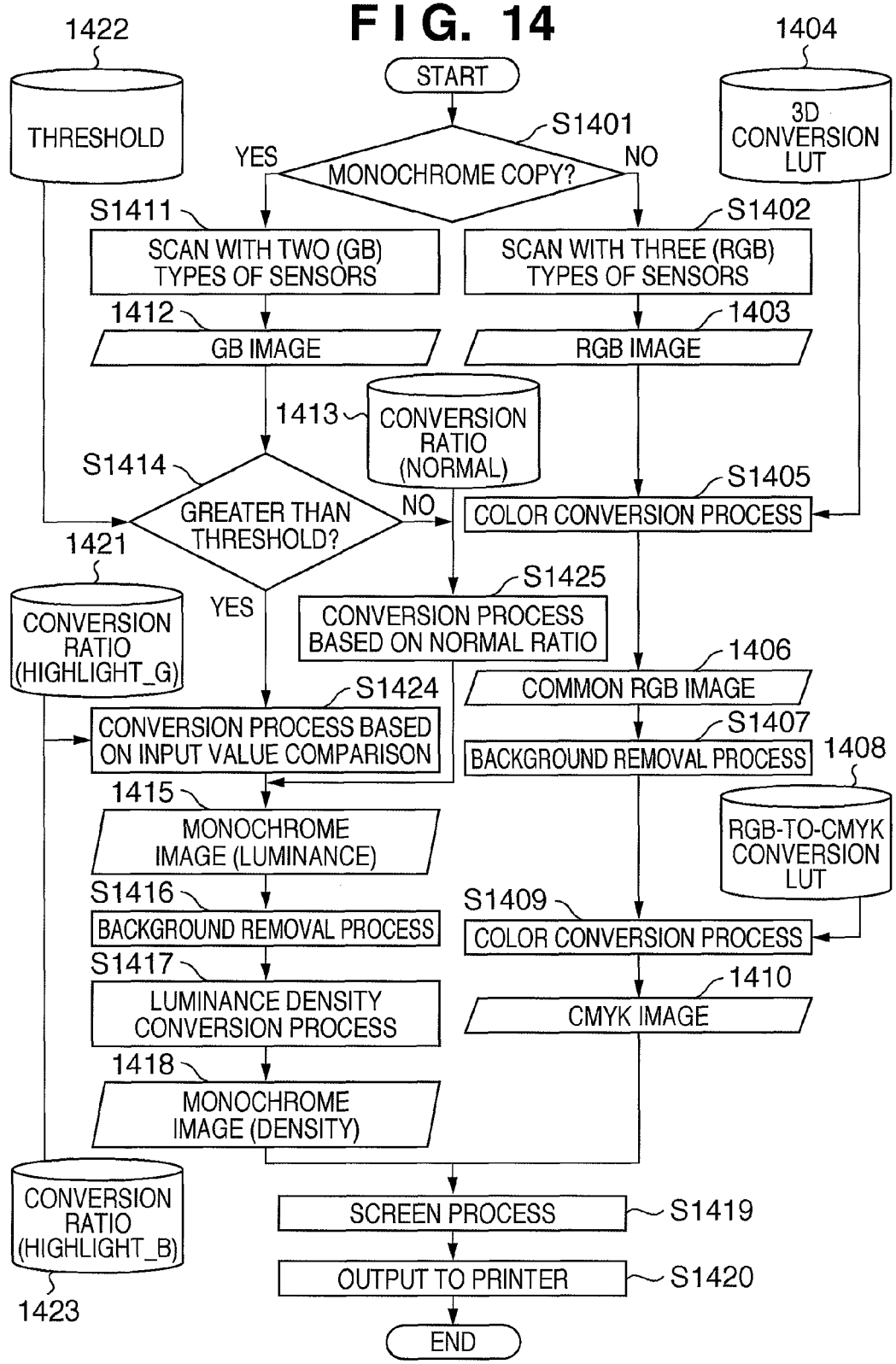
FIG. 14 is a flowchart illustrating a copy process according to a second embodiment using a color MFP.

FIG. 14 is a flowchart illustrating a copy process according to the second embodiment using a color MFP. First, in Step S1401, the data processing device 205 determines whether or not the copy to be made is a monochrome copy. Here, if the copy is a color copy, the procedure moves to Step S1402, where the image reading device 201 performs a scan using three types of sensors, thereby acquiring RGB image data 1403. Note that the processes of Steps S1402 to S1409, S1419, and S1420 are the same as those of Steps S902 to S909, S919, and S920 shown in FIG. 9 and described in the first embodiment, and thus descriptions thereof shall be omitted.

However, if in Step S1401 it has been determined that the copy is a monochrome copy, the procedure advances to Step S1411, where scanning is performed using two types of sensors, and GB image data 1412 is obtained. As in the first embodiment, the sensors with G and B color filters are selected here, but any combination may be used.

Next, in Step S1414, it is determined whether or not the signal value of G or B is greater than a set threshold 1422. In the second embodiment, it is determined whether either G or B is greater than the threshold 1412; however, the processing may be such that a determination of "greater" is made when both G and B are greater than the threshold 1422.

In the case where the result of the determination indicates that the value is not greater than the threshold 1422, a conversion process based on a normal ratio is carried out in Step S1425 using a conversion ratio (normal) 1413, and monochrome image data (luminance) 1415 is generated. Here, the conversion ratio (normal) 1413 is a conversion ratio for data determined not to be highlights based on the threshold determination; in the present example, this ratio is 3:1.

However, in the case where the results of the determination in Step S1414 indicate that the value is greater than the threshold 1422, the procedure advances to Step S1424, where a conversion process is performed in accordance with a comparison of input signal values using a conversion ratio (for highlights_G) 1421 and a conversion ratio (for highlights_B) 1423. In the conversion ratio (for highlights_G) 1421, the ratio of B is set to be high; this conversion ratio is used when it has been determined, through the comparison of the input signal values, that G is greater. Meanwhile, in the conversion ratio (for highlights_B) 1423, the ratio of G is set to be high; this conversion ratio is used when it has been determined, through the comparison of the input signal values, that B is greater. Therefore, the G values and B values of inputted pixels are compared, and the monochrome image data (luminance) 1415 is generated using the conversion ratio (for highlights_G) 1421 when G is greater. However, the monochrome image data (luminance) 1415 is generated using the conversion ratio (for highlights_B) 1423 when B is greater.

Note that the conversion ratio (for highlights_G) 1421 is 1:3, and the conversion ratio (for highlights_B) 1423 is 3:1. Of course, the conversion ratios may use any ratio.

A background removal process, in Step S1416, and a luminance/density conversion process, in Step S1417, are performed on the monochrome image data (luminance) 1415 created in this manner, thereby generating monochrome image data (density) 1418. Then, in Step S1419, a publicly-known screen process is performed, and that screen data is outputted to a printer in Step S1420, in the same manner as the color copy process.

Although several types of fixed blending ratios are used in the second embodiment, the blending ratio may be adaptively changed by, for example, changing the blending ratio based on the input signal values. Furthermore, while the threshold is set using highlights as its reference, any reference may be used for the threshold.

In addition, although a copying process has been described as an example, the present embodiment may be applied to any process as long as that process uses a scanner, such as a transmission process. Furthermore, although the embodiment discusses three types of sensors being installed in the scanner, any number of types may be used as long as that number is three or more.

In addition, it is possible to improve the performance when making a monochrome copy by scanning using two types of sensors. It is furthermore possible to improve the reproducibility when making a monochrome copy of a color document by carrying out processing that focuses on highlight data. Finally, it is possible to greatly reduce the amount of memory consumed by holding the multiple types of ratios as data rather than an LUT when performing conversion.

Third Embodiment

Next, a third embodiment according to the present invention shall be described in detail with reference to the drawings. While in the first embodiment, a 2D-to-1D conversion LUT is generated using 0 as an initial value, the third embodiment describes a method in which the initial value of a 2D-to-1D conversion LUT is changed through a determination based on a threshold, thereby reducing the amount of consumed memory and improving the conversion accuracy.

Figure 15:
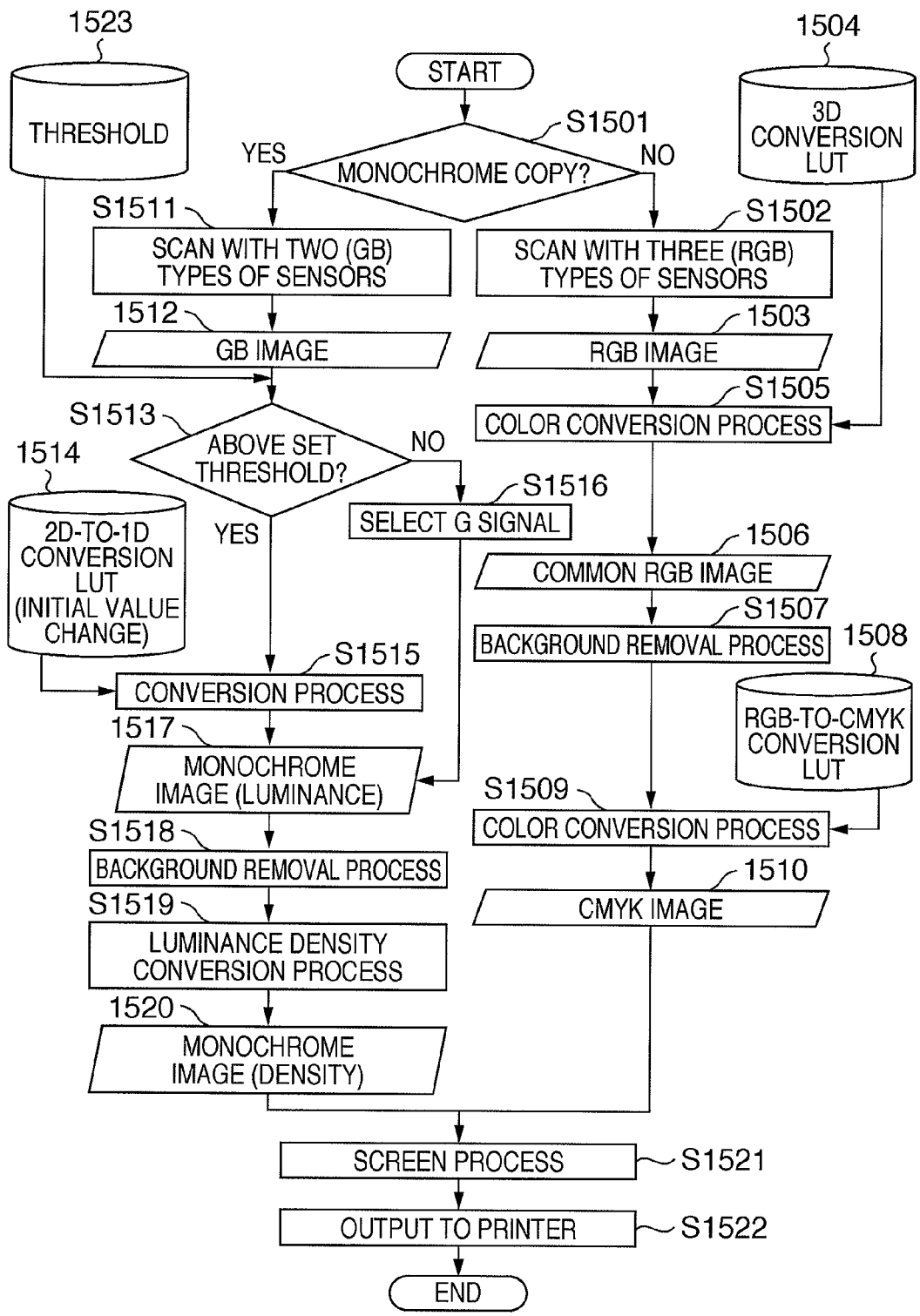
FIG. 15 is a flowchart illustrating a copy process according to a third embodiment using a color MFP.

FIG. 15 is a flowchart illustrating a copy process according to the third embodiment using a color MFP. First, in Step S1501, the data processing device 205 determines whether or not the copy to be made is a monochrome copy. Here, if the copy is a color copy, the procedure moves to Step S1502, where the image reading device 201 performs a scan using three types of sensors, thereby acquiring RGB image data 1503. Note that the processes of Steps S1502 to S1509, S1521, and S1522 are the same as those of Steps S902 to S909, S919, and S920 shown in FIG. 9 and described in the first embodiment, and thus descriptions thereof shall be omitted.

However, if in Step S1501 it has been determined that the copy is a monochrome copy, the procedure advances to Step S1511, where scanning is performed using two types of sensors, and GB image data 1512 is obtained. As in the first embodiment, the sensors with G and B color filters are selected here, but any combination may be used.

Next, in Step S1513, it is determined whether or not the signal value of G or B is greater than a set threshold 1523. In the case where the result of the determination indicates that the values are not greater than the set threshold 1523, the procedure advances to Step S1516, where the G signal is selected and monochrome image data (luminance) 1517 is generated. Here, the B signal may be selected. Furthermore, the monochrome image data (luminance) 1517 may be created using a set ratio, as in the second embodiment.

Meanwhile, in the case where the result of the determination in Step S1513 indicates that the values are greater than the set threshold 1523, the procedure advances to Step S1515, where a conversion process is performed using a 2D-to-1D conversion LUT (initial value change) 1514, and monochrome image data (luminance) 1517 is generated. Descriptions shall now be given regarding the 2D-to-1D conversion LUT (initial value change) 1514.

FIG. 16 is a diagram illustrating an example of a 2D-to-1D conversion LUT (initial value change) in the third embodiment. Here, the "initial value" refers to the initial data of the LUT; as the LUT is generated so as to have a range of 0 to 255 in the first embodiment, the initial value thereof is 0. In the third embodiment, the initial value is not 0; rather, the value of the threshold 1523 is taken as the initial value.

In the third embodiment, the threshold 1523 is 210, and therefore the initial value is also 210, as shown in FIG. 16; thus the LUT is defined to be in the range of 210 to 255. The method for generating the 2D-to-1D conversion LUT (initial value change) 1514 is the same as the method illustrated in FIG. 10 and described in the first embodiment, and thus descriptions thereof shall be omitted here.

In the first embodiment, the LUT has 18 halftones, and thus 324 pieces of data are necessary; however, by using 210 as the initial value, the number of halftones is 4, meaning that only 16 pieces of data are necessary, and thus making it possible to reduce the amount of memory consumed. In addition, it is possible to greatly improve the conversion accuracy with respect to data over the threshold by using the same number as the number of halftones in the LUT.

A background removal process, in Step S1518, and a luminance/density conversion process, in Step S1519, are performed on the monochrome image data (luminance) created in this manner, thereby generating monochrome image data (density) 1520. Then, in Step S1521, a publicly-known screen process is performed, and that screen data is outputted to a printer in Step S1522, in the same manner as the color copy process.

Although the 2D-to-1D conversion LUT 1514 used in the third embodiment is created using several types of fixed blending ratios, the blending ratio may be adaptively changed by, for example, changing the blending ratio based on the input signal values. Furthermore, while the threshold is set using highlights as its reference, any reference may be used for the threshold.

In addition, although a copying process has been described as an example, the present embodiment may be applied to any process as long as that process uses a scanner, such as a transmission process. Furthermore, although the embodiment discusses three types of sensors being installed in the scanner, any number of types may be used as long as that number is three or more.

According to the third embodiment, it is possible to improve the performance when making a monochrome copy by scanning using two types of sensors. It is furthermore possible to improve the reproducibility when making a monochrome copy of a color document by carrying out processing using a 2D-to-1D conversion LUT that focuses on highlight data.

In particular, it is possible to realize a reduction in the amount of memory consumed and an improvement in the conversion accuracy with respect to data above the threshold by creating a 2D-to-1D conversion LUT using data greater than or equal to a specific initial value obtained through a threshold.

Fourth Embodiment

Next, a fourth embodiment according to the present invention shall be described in detail with reference to the drawings. While in the first embodiment, the types of sensors used when scanning is fixed, the fourth embodiment describes a method in which a user is allowed to specify the color s/he wishes to be reproduced, and the two types of sensors that are used are switched in accordance with the specified color.

Figure 17:
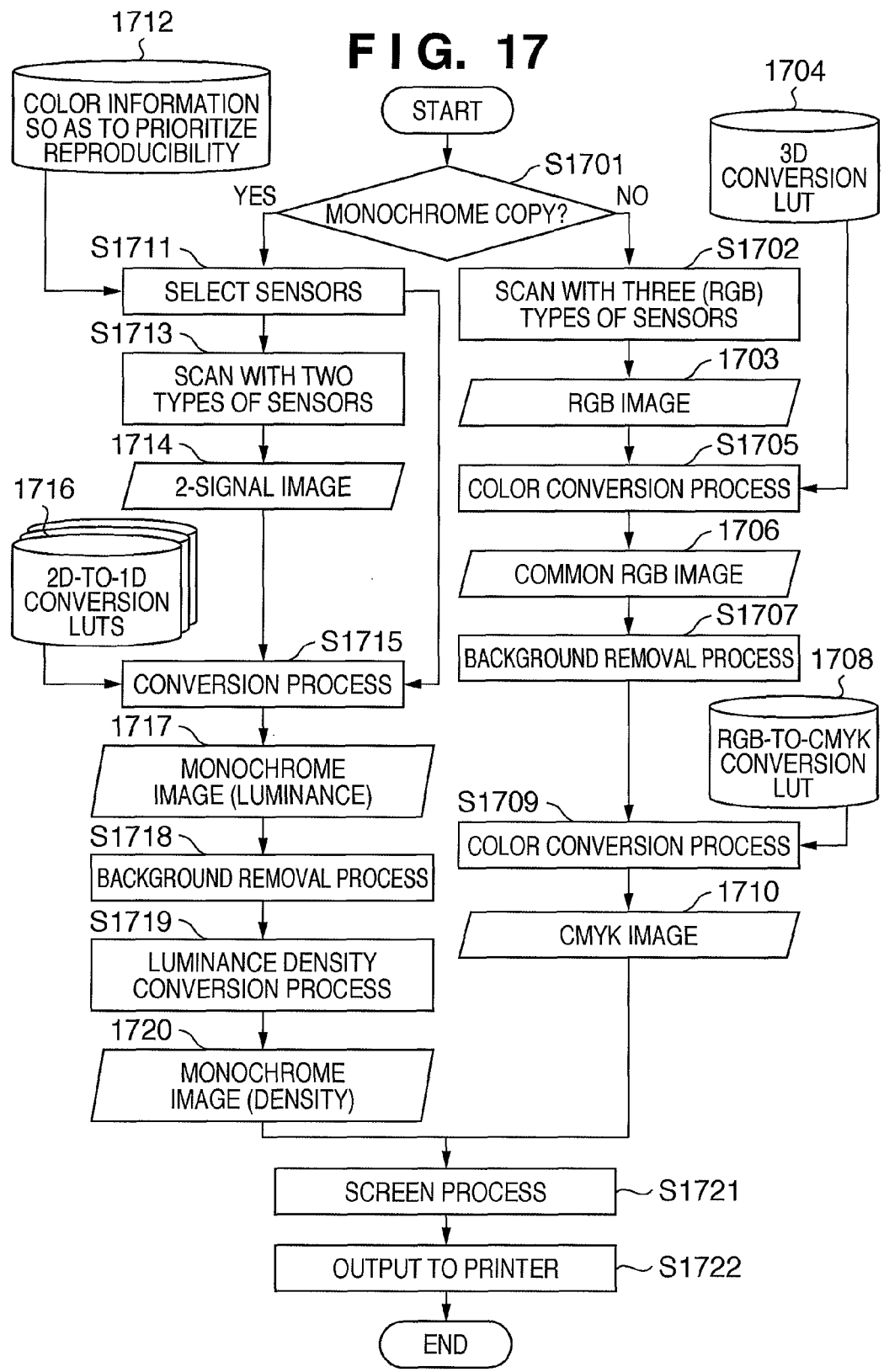
FIG. 17 is a flowchart illustrating a copy process according to a fourth embodiment using a color MFP.

FIG. 17 is a flowchart illustrating a copy process according to the fourth embodiment using a color MFP. First, in Step S1701, the data processing device 205 determines whether or not the copy to be made is a monochrome copy. Here, if the copy is a color copy, the procedure moves to Step S1702, where the image reading device 201 performs a scan using three types of sensors, thereby acquiring RGB image data 1703. Note that the processes of Steps S1702 to S1709, S1721, and S1722 are the same as those of Steps S902 to S909, S919, and S920 shown in FIG. 9 and described in the first embodiment, and thus descriptions thereof shall be omitted.

However, if in Step S1701 it has been determined that the copy is a monochrome copy, the procedure advances to Step S1711, where sensor selection is performed in accordance with color information 1712 that prioritizes reproducibility. Note that the color information 1712 that prioritizes reproducibility is information inputted by the user through a user interface (UI) screen, and is stored in a memory.

FIG. 18 is a diagram illustrating an example of a user interface screen 1801 in the fourth embodiment. The user is prompted to select which color, of red, green, blue, and yellow, s/he wishes to prioritize, after which the selected color information is stored.

Returning to FIG. 17, two types of sensors are selected from the 3 types, or R, G, and B, of sensors in the abovementioned Step S1711, in accordance with the color information. Of course, sensor information that has been associated with the color information in advance may be used as the color information 1712 so as to prioritize reproducibility, rather than using the color information itself.

Note that if the spectral properties of the color selected by the user and the two types of sensors overlap, the color will resemble white, and thus the reproducibility of highlights will suffer. Accordingly, the two types of sensors are selected with this point in mind. For example, in the case where the user has selected red, the two types of sensors are selected so that R is included therein. In addition, in the case where the user has selected green, the two types of sensors are selected so that G is included therein, whereas in the case where the user has selected blue, the two types of sensors are selected so that B is included therein. Furthermore, in the case where the user has selected yellow, the spectral properties will overlap if R and G are selected, and the reproducibility of highlights will suffer; therefore, the two types of sensors are selected so that B is included therein.

Next, in Step S1713, scanning is performed using the two types of sensors selected in Step S1711, and image data 1714, from two types of signals, is obtained. Then, in Step S1715, a conversion process is performed on the image data 1714 from two types of signals using a 2D-to-1D conversion LUT 1716, thereby generating monochrome image data (luminance) 1717. Unlike the first embodiment, there are multiple 2D-to-1D conversion LUTs 1716 because it is necessary to generate LUTs for all combinations of sensors. The optimal LUT is selected from the 2D-to-1D conversion LUTs 1716 using the information of the sensors selected in Step S111.

A background removal process, in Step S1718, and a luminance/density conversion process, in Step S1719, are performed on the monochrome image data (luminance) 1717 created in this manner, thereby generating monochrome image data (density) 1720. Then, in Step S1721, a publicly-known screen process is performed, and that screen data is outputted to a printer in Step S1722, in the same manner as the color copy process.

Although the 2D-to-1D conversion LUT 1716 used in the fourth embodiment is created using several types of fixed blending ratios, the blending ratio may be adaptively changed by, for example, changing the blending ratio based on the input signal values. Furthermore, while the threshold is set using highlights as its reference, any reference may be used for the threshold.

The user interface and sensor selection may also be applied in the second and third embodiments.

In addition, although a copying process has been described as an example, the present embodiment may be applied to any process as long as that process uses a scanner, such as a transmission process. Furthermore, although the embodiment discusses three types of sensors being installed in the scanner, any number of types may be used as long as that number is three or more.

Furthermore, although the example given describes the user selecting the color s/he wishes to reproduce through a user interface, a user interface that prompts the user to directly select the sensors may by employed instead.

According to the fourth embodiment, it is possible to improve the performance when making a monochrome copy by scanning using two types of sensors. It is furthermore possible to improve the reproducibility when making a monochrome copy of a color document by carrying out processing using a 2D-to-1D conversion LUT that focuses on highlight data.

Furthermore, because the information of the color that the user wishes to reproduce is acquired and the two types of sensors are selected in accordance with that color information, it is possible to improve the reproducibility for all color documents that the user wishes to copy.

The present invention may be applied to a system configured of a plurality of devices (e.g., a host computer, an interface device, a reader, a printer, and so on) or to an apparatus configured of a single device (e.g., a copy machine, a facsimile device, and so on).

Furthermore, it goes without saying that the object of the present invention can also be achieved by supplying, to a system or apparatus, a storage medium in which the program code for software that realizes the functions of the aforementioned embodiments has been stored, and causing a computer (CPU or MPU) of the system or apparatus to read out and execute the program code stored in the storage medium.

In such a case, the program code itself read out from the computer-readable storage medium implements the functionality of the aforementioned embodiments, and the storage medium in which the program code is stored composes the present invention.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiments by a computer executing the read-out program code. That is, the case where an operating system (OS) or the like running in a computer performs part or all of the actual processing based on instructions in the program code, and the functionality of the aforementioned embodiments is realized by that processing, is included in the scope of the present invention.

Furthermore, the program code read out from the storage medium may be written into a memory provided in a function expansion board installed in the computer or a function expansion unit connected to the computer. Then, a CPU or the like included in the function expansion board or expansion unit performs all or part of the actual processing based on instructions included in the program code, and the functions of the aforementioned embodiments may be implemented through that processing. It goes without saying that this also falls within the scope of the present invention.

According to the present invention, it is possible to reproduce highlight portions of colors when performing color conversion processing on color image data made up of two color components and outputting monochrome image data. In addition, it is possible to reproduce the highlight portions of monochrome image data without harming the performance during copying.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-317589, filed Dec. 7, 2007, which is hereby incorporated by reference herein in its entirety.

What is claimed is:

1. An image processing apparatus comprising:
a reading unit constructed to read a color document using sensors for two color components; and
a generation unit constructed to generate monochrome image data by performing a color conversion process on color image data having two color components obtained from the reading unit,
wherein the color conversion process generates the monochrome image data by processing the color image data made up of two color components using a Look-Up Table that outputs one-dimensional output data for two-dimensional input data that has been combined in accordance with a predetermined rule, and
wherein the data of each of the two color components are compared to a threshold, and in the case where the data of the two color components are not greater than the threshold, the data of the two color components are blended using a specific ratio and the blended one-dimensional data is output from the Look-Up Table, whereas in the case where the data of either of the two color components is greater than the threshold, the data of the two color components are compared to each other, the ratio of the lower data is increased, blending is performed, and the blended one-dimensional data is output from the Look-Up Table.

2. The apparatus according to claim 1, wherein the threshold is defined based on a highlight in the data of the two color components.

3. An image processing apparatus comprising:
a reading unit constructed to read a color document using sensors for two color components; and
a generation unit constructed to generate monochrome image data by performing a color conversion process on color image data having two color components obtained from the reading unit,
wherein the color conversion process compares the data of each of the two color components to a threshold, and in the case where the data of the two color components are not greater than the threshold, the data of the two color components are blended using a predetermined conversion ratio, and the monochrome image data is generated, whereas in the case where either of the data of the two color components is greater than the threshold, the values of the data of the two color components are compared to each other, the data of the two color components are blended using a conversion ratio in which the ratio of the color component with the lower data value is increased, and the monochrome image data is generated.

4. The apparatus according to claim 3, wherein the threshold is defined based on a highlight in the data of the two color components.

5. An image processing apparatus comprising:
a reading unit constructed to read a color document using sensors for two color components; and
a generation unit constructed to generate monochrome image data by performing a color conversion process on color image data having two color components obtained from the reading unit,
wherein the color conversion process generates the monochrome image data by processing the color image data made up of two color components using a Look-Up Table that outputs one-dimensional output data for two-dimensional input data that has been combined in accordance with a predetermined rule, and
wherein the color conversion process generates the monochrome image data based on the data of a single color component in the case where the data of the two color components are not greater than a set threshold, and generates the monochrome image data using a Look-Up Table in which the initial values of the Look-Up Table have been changed based on the threshold in the case where either of the two color components is greater than the threshold.

6. An image processing apparatus comprising:
a reading unit constructed to read a color document using sensors for two color components; and
a generation unit constructed to generate monochrome image data by performing a color conversion process on color image data having two color components obtained from the reading unit,
wherein the color conversion process generates the monochrome image data by processing the color image data made up of two color components using a Look-Up Table that outputs one-dimensional output data for two-dimensional input data that has been combined in accordance with a predetermined rule, and
wherein a plurality of Look-Up Tables, corresponding to a combination of two color components from among three or more color components, are generated in advance; and
the color conversion process generates the monochrome image data by performing a color conversion process on the color image data using Look-Up Tables that correspond to two color components specified by a user.

7. An image processing method comprising:
reading a color document using sensors for two color components; and
generating monochrome image data by performing a color conversion process on color image data having two color components obtained in the reading step,
wherein the color conversion process generates the monochrome image data by processing the color image data made up of two color components using a Look-Up Table that outputs one-dimensional output data for two-dimensional input data that has been combined in accordance with a predetermined rule, and
wherein the data of each of the two color components are compared to a threshold, and in the case where the data of the two color components are not greater than the threshold, the data of the two color components are blended using a specific ratio and the blended one-dimensional data is output from the Look-Up Table, whereas in the case where the data of either of the two color components is greater than the threshold, the data of the two color components are compared to each other, the ratio of the lower data is increased, blending is performed, and the blended one-dimensional data is output from the Look-Up Table.

8. A non-transitory computer-readable storage medium on which is stored a program for causing a computer to execute the image processing method according to claim 7.

9. An image processing method comprising:
   reading a color document using sensors for two color components; and
   generating monochrome image data by performing a color conversion process on color image data having two color components obtained in the reading step,
   wherein the color conversion process compares the data of each of the two color components to a threshold, and in the case where the data of the two color components are not greater than the threshold, the data of the two color components are blended using a predetermined conversion ratio, and the monochrome image data is generated, whereas in the case where either of the data of the two color components is greater than the threshold, the values of the data of the two color components are compared to each other, the data of the two color components are blended using a conversion ratio in which the ratio of the color component with the lower data value is increased, and the monochrome image data is generated.

* * * * *